(12) United States Patent
Lin et al.

(10) Patent No.: US 11,397,664 B2
(45) Date of Patent: Jul. 26, 2022

(54) SYSTEM AND METHOD FOR PRODUCING TEST DATA

(71) Applicant: Institute For Information Industry, Taipei (TW)

(72) Inventors: Pei-Yi Lin, Taipei (TW); Ting-Chun Huang, Taipei (TW); Tsung-Ta Tsai, Taipei (TW); Chia-Wei Tien, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 59 days.

(21) Appl. No.: 16/699,482

(22) Filed: Nov. 29, 2019

(65) Prior Publication Data

US 2021/0141715 A1 May 13, 2021

(30) Foreign Application Priority Data

Nov. 11, 2019 (TW) .................................. 108140848

(51) Int. Cl.
*G06F 11/36* (2006.01)
*G06N 5/04* (2006.01)
*G06N 20/00* (2019.01)

(52) U.S. Cl.
CPC ...... *G06F 11/3684* (2013.01); *G06F 11/3688* (2013.01); *G06F 11/3692* (2013.01); *G06N 5/048* (2013.01); *G06N 20/00* (2019.01)

(58) Field of Classification Search
CPC ............. G06F 11/3684; G06F 11/3688; G06F 11/3692; G06F 16/9535; G06N 20/00; G06N 5/048; G06N 7/02; G06N 5/04; G06N 3/08; G06K 9/6256
See application file for complete search history.

(56) References Cited

U.S. PATENT DOCUMENTS

| | | | | |
|---|---|---|---|---|
| 6,044,480 A | * | 3/2000 | Keen | H04L 1/242 714/712 |
| 2015/0319072 A1 | * | 11/2015 | Chakrabarti | H04L 43/50 370/250 |
| 2017/0187585 A1 | * | 6/2017 | Yew | H04L 43/04 |
| 2017/0286279 A1 | * | 10/2017 | Allison | H04L 65/60 |
| 2017/0308701 A1 | | 10/2017 | Nandha Premnath et al. | |
| 2018/0197106 A1 | * | 7/2018 | Fujitani | G06N 20/00 |

(Continued)

FOREIGN PATENT DOCUMENTS

| CN | 104796240 A | 7/2015 |
|---|---|---|
| JP | 2010236302 A | 10/2010 |

(Continued)

OTHER PUBLICATIONS

"El-alfy, Detecting Cyber-Attacks on Wireless Mobile Networks Using Multicriterion Fuzzy Classifier with Genetic Attribute Selection, 2015" (Year: 2015).*

(Continued)

*Primary Examiner* — Chat C Do
*Assistant Examiner* — Noor Alkhateeb
(74) *Attorney, Agent, or Firm* — CKC & Partners Co., LLC

(57) ABSTRACT

A system for producing test data produces fuzzing data at least according to first test data which is used for testing at least one first device and second test data which is used for testing a second device. Then, the system transmits the fuzzing data to the second device so as to test the second device.

14 Claims, 7 Drawing Sheets

(56) References Cited

U.S. PATENT DOCUMENTS

| | | | |
|---|---|---|---|
| 2018/0359273 A1* | 12/2018 | Woolley | H04L 63/1433 |
| 2018/0365139 A1 | 12/2018 | Rajpal et al. | |
| 2019/0044942 A1 | 2/2019 | Gordon et al. | |
| 2019/0109872 A1 | 4/2019 | Dhakshinamoorthy et al. | |
| 2019/0163666 A1* | 5/2019 | Cakmak | G06N 5/04 |
| 2019/0213115 A1* | 7/2019 | Takawale | G06F 8/30 |
| 2020/0028905 A1* | 1/2020 | Chinitz | H04L 43/50 |
| 2020/0202987 A1* | 6/2020 | Graham | G16H 50/50 |

FOREIGN PATENT DOCUMENTS

| | | |
|---|---|---|
| JP | 2017194895 A | 10/2017 |
| JP | 2018-098707 A | 6/2018 |
| WO | 2008120552 A1 | 10/2008 |

OTHER PUBLICATIONS

Fending Off Cyber Attacks—Hardening ECUs by Fuzz Testing, Aug. 2018 (Year: 2018).*

IoTFuzzer: "Discovering Memory Corruptions in IoT Through App-based Fuzzing", Chen et al., Feb. 2018 (Year: 2018).*

Office Action to the corresponding Taiwan Patent Application rendered by the Taiwan Intellectual Property Office (TIPO) dated Dec. 23, 2020, 9 pages (including English translation of summary).

Yuwei Li, et al.; V-Fuzz: Vulnerability-Oriented Evolutionary Fuzzing; arXiv preprint arXiv:1901.01142; Jan. 4, 2019; 16 pages.

Notice of Reasons for Refusal to the corresponding JP Patent Application rendered by the Japan Patent Office (JPO) dated Feb. 16, 2021, 6 pages (including English translation).

* cited by examiner

|       | B11 | B12    | B13   | B14 |   |   |   |   |   |
|-------|-----|--------|-------|-----|---|---|---|---|---|
| TD1_1 → | 00  | 05 02  | 00 c4 | 0   | 0 | 1 | 6 | 0 | 1 |
| TD1_2 → | 25  | 05 05  | 43 2  | 4   | 0 | 1 | 0 | 2 | 2 |
| TD1_3 → | 13  | 05 08  | 17 70 | 5   | 0 | 8 | 7 | 6 | 3 |
| ...   | ... | ...    | ...   | ... | ... | ... | ... | ... | ... |

TD1

|       | B21 | B22   | B23  | B24 |   |   |   |   |   |
|-------|-----|-------|------|-----|---|---|---|---|---|
| TD2_1 → | 10  | 10 10 | 1 10 | 3   | 3 | 0 | 5 | 0 | 1 |
| TD2_2 → | 10  | 0 ae  | 0 0  | 5   | 2 | 6 | 5 | 1 | 4 |
| TD2_3 → | 10  | 0 4c  | 5 70 | 0   | 0 | 9 | 0 | 3 | 7 |
| ...   | ... | ...   | ...  | ... | ... | ... | ... | ... | ... |

FTD

| | | | | | | | | | |
|---|---|---|---|---|---|---|---|---|---|
| FTD_1 ---> | 10 | 05 | 02 | 00 | c4 | 0 | 0 | 0 | 1 | 6 | 0 | 1 |
| FTD_2 ---> | 10 | 05 | 05 | 43 | 2 | 4 | 0 | 1 | 0 | 2 | 2 |
| FTD_3 ---> | 10 | 05 | 08 | 17 | 70 | 5 | 0 | 8 | 7 | 6 | 3 |
| FTD_4 ---> | 10 | 10 | 10 | 1 | 10 | 3 | 3 | 0 | 5 | 0 | 1 |
| FTD_5 ---> | 10 | 0 | ae | 0 | 0 | 5 | 2 | 6 | 5 | 1 | 4 |
| FTD_6 ---> | 10 | 0 | 4c | 5 | 70 | 0 | 0 | 9 | 0 | 3 | 7 |
| ... | ... | ... | ... | ... | ... | ... | ... | ... | ... | ... | ... |

FIG. 3C

| Abnormal State | Description | Weight of Strategy A | Weight of Strategy B |
|---|---|---|---|
| S1 | The response time is too long. | 1 | 2 |
| S2 | The device needs to be rebooted | 1 | 7 |
| S3 | The connection needs to be reset | 1 | 3 |

| Mutation Pattern | Test Result of Previous Round | Original Weight | Weight of Strategy A | Weight of Strategy B |
|---|---|---|---|---|
| M1 | S1, S2 | 1 | 2 | 9 |
| M2 | S3 | 1 | 1 | 3 |
| M3 | S2, S3 | 1 | 2 | 10 |
| M4 | S1 | 1 | 1 | 2 |
| M5 | S1, S3 | 1 | 2 | 5 |

SYSTEM AND METHOD FOR PRODUCING TEST DATA

PRIORITY

This application claims priority to Taiwan Patent Application No. 108140848 filed on Nov. 11, 2019, which is hereby incorporated by reference in its entirety.

FIELD

The present disclosure relates to a system and a method for producing test data. More particularly, the present disclosure relates to a system and a method for producing diverse test data.

BACKGROUND

Some cyberattacks have evolved from monotonous cyberattacks to multifaceted cyberattacks. Said monotonous cyberattacks refer to that the attacker (or a hacker) attacks one specific device for its vulnerabilities only, whereas said multifaceted cyberattacks refer to that the one attacks the device for not only its vulnerabilities but also other devices' vulnerabilities. Because of lack of test information of other devices, conventional testing modes against monotonous cyberattacks hardly take effect in multifaceted cyberattacks. Therefore, it is essential to provide a testing mode bearable of multifaceted cyberattacks.

SUMMARY

Provided is a system for producing test data. The system may comprise a storage, a processor electrically connected with the storage, and a transceiver electrically connected with the processor. The storage may be configured to store first test data for testing at least one first device and second test data for testing a second device. The first test data and the second test data both conform to a protocol. The processor may be configured to produce fuzzing data at least according to the first test data and the second test data. The transceiver may be configured to transmit the fuzzing data to the second device so as to test the second device.

Also provided is a method for producing test data. The method may comprise:

producing fuzzing data by a test data production system at least according to first test data which is used for testing at least one first device and second test data which is used for testing a second device; and transmitting the fuzzing data from the test data production system to the second device so as to test the second device.

As described above, the fuzzing data used to test the second device is produced via merging its own second test data and the first test data of at least one first device. In other words, since the fuzzing data additionally includes the first test data for testing the at least one first device, the deficiencies of the second test data can be compensated, thereby improving the depth and scope of testing the second device and further increasing diversity of testing the second device. Therefore, compared with the conventional testing modes, a testing mode of using the fuzzing data produced by the system and method for producing test data of the present disclosure is able to effectively resist the multifaceted cyberattacks. The aforesaid content is not intended to limit the present invention, but merely describes the technical problems that can be solved by the present invention, the technical means that can be adopted, and the technical effects that can be achieved, so that people having ordinary skill in the art can basically understand the present invention. People having ordinary skill in the art can understand the various embodiments of the present invention according to the attached figures and the content recited in the following embodiments.

BRIEF DESCRIPTION OF THE DRAWINGS

The drawings are provided for describing various embodiments, in which:

FIG. 3A illustrates first test data and second test data according to one or more embodiments of the present invention;

FIG. 3C illustrates the result of merging the first test data and the second test data;

DETAILED DESCRIPTION

The exemplary embodiments described below are not intended to limit the present invention to any specific environment, applications, structures, processes or steps as described in these example embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
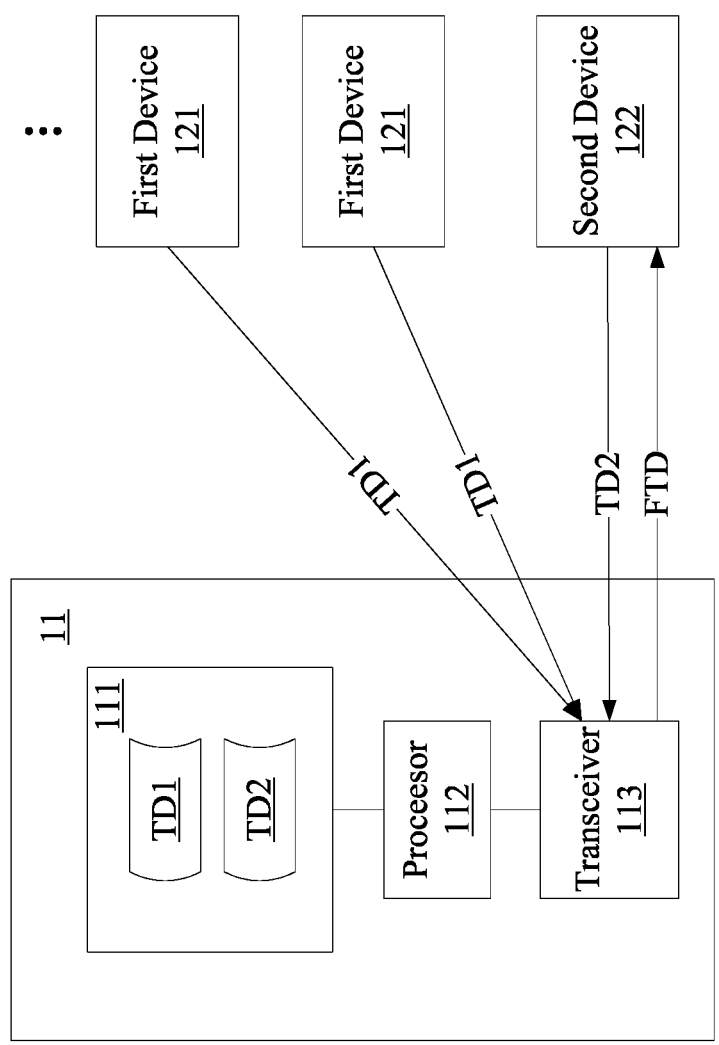
FIG. 1 illustrates a system for producing test data according to one or more embodiments of the present invention.

FIG. 1 illustrates a system for producing test data according to one or more embodiments of the present invention. The contents shown in FIG. 1 are merely for explaining the embodiments of the present invention instead of limiting the present invention.

Referring to FIG. 1, a system 11 for producing test data (or a test data production system 11) may communicate with at least one first device 121 and a second device 122 (which is the device under test), and produce fuzzing data FTD used for testing the second device 122 at least according to first test data TD1 received from the at least one first device 121 and second test data TD2 received from the second device 122. The test data production system 11 may be implemented with a single physical computer or multiple physical computers that are mutually connected. The test data production system 11 may basically comprise a storage 111, a processor 112 and a transceiver 113, and the processor 112 may be electrically connected with the storage 111 and the transceiver 113 respectively.

The storage 111 may be configured to store the data produces by the test data production system 11 or received from the outside of the test data production system 11. For example, the data may include the first test data TD1 and the second test data TD2. The storage 111 may comprise a first-level memory (also referred to as main memory or internal memory), and the processor 112 may directly read the instruction set stored in the first-level memory and execute the instruction sets as needed. The storage 111 may optionally comprise a second-level memory (also referred to as an external memory or a secondary memory), and the second-level memory may transmit the stored data to the first-level memory through the data buffer. For example, the second-level memory may be, but not limited to, a hard disk, a compact disk, or the like. The storage 111 may optionally comprise a third-level memory, that is, a storage device that may be directly inserted or removed from a computer, such as a portable hard disk. In some embodiments, the storage 111 may optionally comprise a cloud storage unit.

The processor 112 may be a microprocessor or a microcontroller having a signal processing function. A microprocessor or microcontroller is a programmable special integrated circuit that has the functions of operation, storage, output/input, etc., and can accept and process various coding instructions, thereby performing various logic operations and arithmetic operations, and outputting the corresponding operation result. The processor 112 may be programmed to execute various operations or programs in the test data production system 11.

The transceiver 113 may be configured to communicate with the first device(s) 121 and the second device 122 in a wired or a wireless manner, and may comprise a transmitter and a receiver. Taking wireless communication for example, the transceiver 113 may comprise for example but not limited to communication elements such as an antenna, an amplifier, a modulator, a demodulator, a detector, an analog-to-digital converter, a digital-to-analog converter or the like. Taking wired communication for example, the transceiver 113 may be, but not limited to, a gigabit Ethernet transceiver, a gigabit interface converter (GBIC), a small form-factor pluggable (SFP) transceiver, a ten gigabit small form-factor pluggable (XFP) transceiver, or the like.

Figure 2:
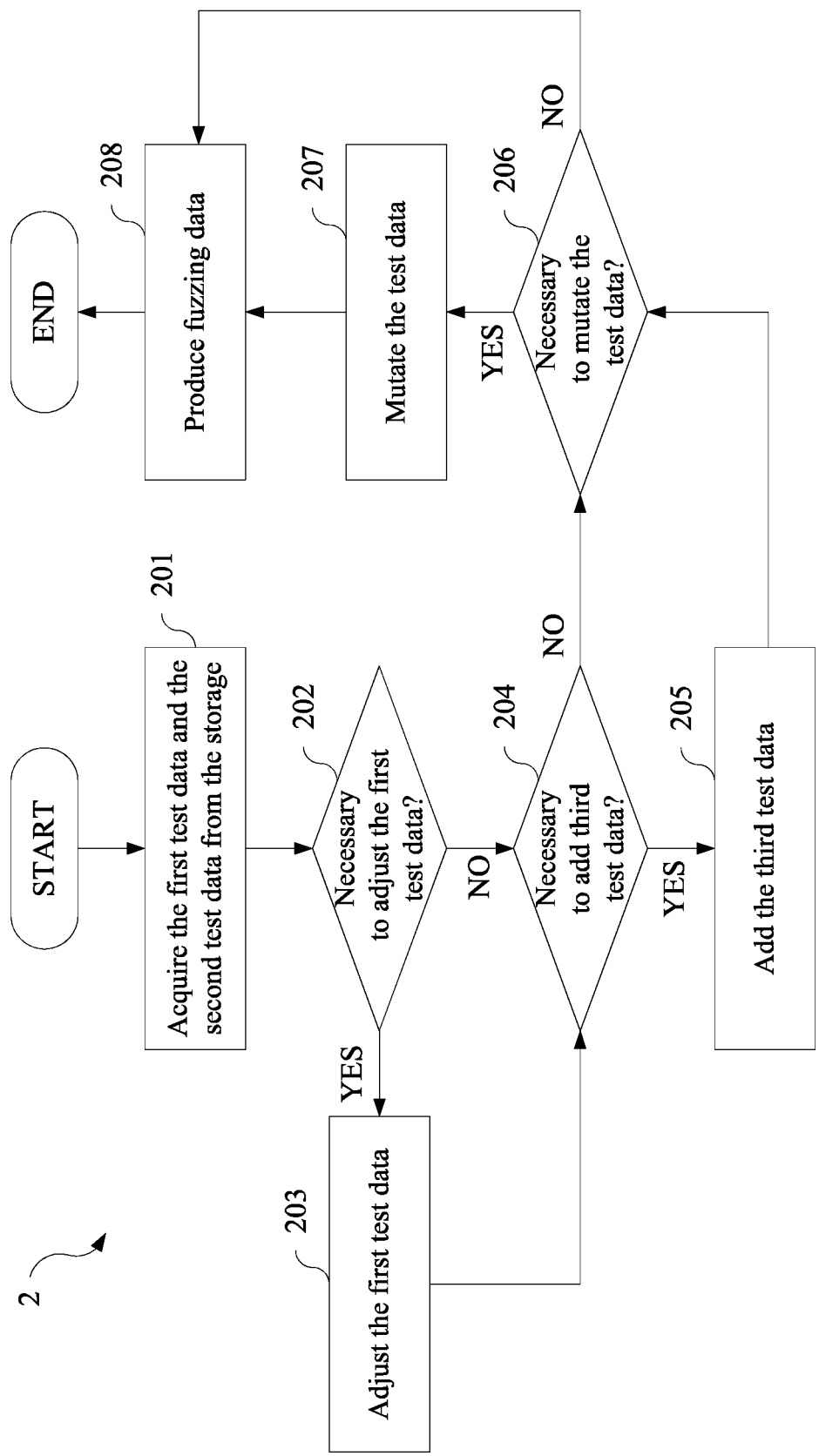
FIG. 2 illustrates how the system shown in FIG. 1 produces fuzzing data.

FIG. 2 illustrates how the system shown in FIG. 1 produces fuzzing data. The contents shown in FIG. 2 are merely for explaining the embodiments of the present invention instead of limiting the present invention.

In the present disclosure, the second device 122 is assumed to be the device under test unless explained otherwise. Referring to FIG. 2, in a process 2 for producing fuzzing data, the processor 112 may first acquire the first test data TD1 and the second test data TD2 from the storage 111 (marked as an action 201). The first test data TD1 is the test data suitable for test testing the first device 121, and the second test data TD2 is the test data suitable for testing the second device 122. In some embodiments, the first test data TD1 is transmitted to the transceiver 113 by the first device 121 itself, and the second test data TD2 is transmitted to the transceiver 113 by the second device 122 itself. In some embodiments, the first test data TD1 may be transmitted to the transceiver 113 by other devices than the first device 121, and the second test data TD2 may be transmitted to the transceiver 113 by other devices than the second device 122. The actions 202-207 may be omitted if there is no need to adjust the first test data TD1, add third test data and mutate the test data, and thus the action 201 is followed directly by an action 208. Therefore, in some embodiments, the processor 112 may directly merge the first test data TD1 and the second test data TD2 into fuzzing data FTD, and transmit the fuzzing data FTD to the second device 122 for its testing via the transceiver 113.

Figure 3B:
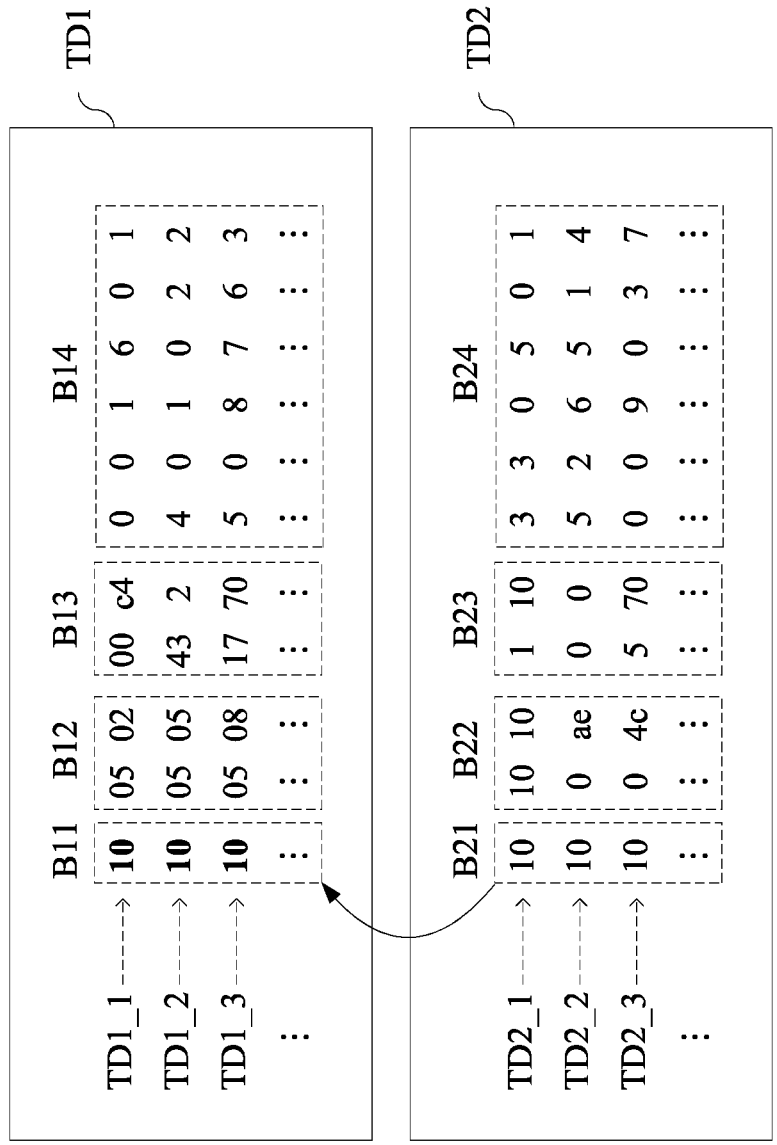
FIG. 3B illustrates how to adjust the first test data according to the second test data.

In some embodiments, the processor 112 may adjust the first test data TD1 before producing the fuzzing data FTD. This will be further described with FIGS. 3A-3C by way of an example, wherein FIG. 3A illustrates first test data and second test data according to one or more embodiments of the present invention, FIG. 3B illustrates how to adjust the first test data according to the second test data, and FIG. 3C illustrates the result of merging the first test data and the second test data. The contents shown in FIGS. 3A-3C are merely for explaining the embodiments of the present invention instead of limiting the present invention.

Referring to FIG. 3A, the first test data TD1 may comprise a plurality of test sub-data TD1_1, TD1_2, TD1_3, . . . , and the second test data TD2 may comprise a plurality of test sub-data TD2_1, TD2_2, TD2_3, . . . . The first test data TD1 and the second test data TD2 both conform to the format of the same protocol, and thus the first test data TD1 and the second test data TD2 may be respectively divided into a plurality of blocks corresponding to each other. For example, the first test data TD1 and the second test data TD2 may be divided into such blocks as "header", "payload length", "topic length", "topic name", "message ID", and "message content" in the case where the first device 121 and the second device 122 both conform to the Message Queuing Telemetry Transport (MQTT) protocol.

Further, in the case where the protocol to which the first test data TD1 and the second test data TD2 conform is known, the processor 112 may divide the first test data TD1 into a plurality of first blocks (e.g., first blocks B11, B12, B13 and B14), and divide the second test data TD2 into a plurality of second blocks (e.g., second blocks B21, B22, B23 and B24) corresponding to the first blocks respectively, with a tool such as PyShark. In the case where the protocol to which the first test data TD1 and the second test data TD2 conform is unknown, the processor 112 may divide the first test data TD1 into the first blocks and divide the second test data TD2 into the second blocks with a tool such as the Needleman-Wunsch algorithm.

Although the first test data TD1 and the second test data TD2 conform to the same protocol, the operating environments and the functions of the first device 121 may be different from those of the second device 122, and thus the first test data TD1 may not be as suitable for testing the second device 122 as the second test data TD2. Under such circumstances, the processor 112 may determine whether it is necessary to adjust the first test data TD1 (marked as an action 202) to make it more suitable for testing the second device 122 by analyzing the difference rate of the data of each block in the second test data TD2.

To be more specific, the processor 112 may calculate block difference rates of the second blocks B21, B22, B23, and B24 in the second test data TD2 according to the change of the values of the second blocks respectively. For example, the processor 112 may respectively calculate the longest common subsequence (LCS) of the second blocks B21, B22, B23, and B24 with the Needleman-Wunsch algorithm, Smith-Waterman algorithm, or Hirschberg's algorithm etc., and then obtain the respective change of values of the second blocks B21, B22, B23, and B24. Taking FIG. 3A as an example, the block difference rates D1, D2, D3, and D4 of the second blocks B21, B22, B23, and B24 are 0%, 30%, 40%, and 90% respectively. The block difference rate D1 being 0% indicates that there is no difference in the content of the data in the second block B21 (e.g., all the data with the same value of "10"), and the block difference rate D2 being 30% indicates that the rate of change in the content of the data in the second block B22 is 30%, and so on.

After obtaining the block difference rates of all of the blocks in the second test data TD2, the processor 112 may determine whether any block difference rate is lower than a preset threshold to determine whether to adjust the first test data TD1 accordingly. For example, if the preset threshold is 5%, the processor 112 may adjust the first block B11 in the first test data TD1 (marked as the action 203) according to the block difference rate D1 being less than the preset threshold (indicating that the result of the determination at the action 202 is YES) so as to increase the acceptance of the first test data TD1 by the second device 122. Taking FIG. 3B as an example, the processor 112 may adjust the first block B11 to be the same as the content of the second block B21, i.e., the value of "10". In some embodiments, if the block difference rate D1 of the second block B21 is not 0% (e.g., 3%), the processor 112 may adjust the content of the block B11 to the value that has the highest repetition rate in the second block B21.

After the processor 112 adjusts the first test data TD1, if it is not necessary to add the third test data and to mutate the test data, the actions 204-207 may be omitted, and the action 203 is followed directly by the action 208. Therefore, in some embodiments, the processor 112 may merge the adjusted first test data TD1 and the second test data TD2 into the fuzzing data FTD after adjusting the first test data TD1. Taking FIG. 3C as an example, the processor 112 may merge the adjusted first test data TD1 and the second test data TD2 into a fuzzing data FTD including fuzzing sub-data FTD_1, FTD_2, FTD_3, FTD_4, FTD_5, and FTD_6. The transceiver 113 may then transmit the fuzzing data FTD shown in FIG. 3C to the second device 122 for its testing.

In some embodiments, the processor 112 may determine whether it is necessary to add the third test data that conforms to the same protocol (marked as an action 204) to increase the diversity of the test data. If the result of the determination at the action 204 is YES, the processor 112 may create a data production model with a machine-learning algorithm based on the format and content of the second test data TD2 and the first test data TD1 obtained from the action 201 or the adjusted first test data TD1 obtained from the action 203, and the processor 112 may use the data production model to produce the third test data (marked as an action 205). For example, the machine-learning algorithm may be, but not limited to, a Long Short-Term Memory (LSTM), a Recurrent Neural Network (RNN), and a Deep Neural Network. (DNN) or other algorithms related to deep learning.

After the processor 112 additionally produces the third test data, the actions 206-207 may be omitted if the mutation of the test data is not required, and thus the action 205 is followed directly by the action 208. Therefore, in some embodiments, the processor 112 may merge the first test data TD1 (or the adjusted first test data TD1), the second test data TD2, and the third test data into fuzzing data FTD after producing the third test data. The transceiver 113 may then transmit the fuzzing data FTD to the second device 122 for its testing.

In some embodiments, the processor 112 may determine whether it is necessary to mutate the test data (marked as the action 206). If the result of the determination at the action 206 is "YES", the test data is mutated (marked as the action 207) to increase the likelihood that the second device 122 will experience more abnormal states during the test. In some embodiments, the processor 112 may mutate the first test data TD1 and the second test data TD2 after acquiring the first test data TD1 and the second test data TD2 (i.e., the action 201), and then merge the mutated test data into the fuzzing data FTD. In some embodiments, the processor 112 may mutate the adjusted first test data TD1 and the second test data TD2 after adjusting the first test data TD1 (i.e., the action 203), and then merge the mutated test data into the fuzzing data FTD. In some embodiments, the processor 112 may mutate the second test data TD2, the third test data, and the first test data TD1 (or the adjusted first test data TD1) after adding the third test data (i.e., the action 205), and then merge the mutated test data into the fuzzing data FTD. The processor 122 may mutate the test data based on different mutation patterns, wherein each mutation pattern represents a way of mutation for mutating a certain block in the test data, and the way of mutation may be, for example, a bit mutation, a character mutation or a length mutation.

Figure 4:
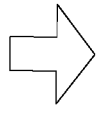
FIG. 4 illustrates how the system shown in FIG. 1 adjusts the weights of the mutation patterns to produce test data that is more likely to cause abnormal state at a device.

In some embodiments, the processor 122 may also determine the weight of mutation patterns of the test data based on the result of testing the second device 122 at the previous round so as to increase the probability of choosing those that tend to cause the abnormal states of the second device 122 during the test. This will be described with FIG. 4 by way of an example. FIG. 4 illustrates how the system shown in FIG. 1 adjusts the weights of the mutation patterns to produce test data that is more likely to cause abnormal state at a device. The contents shown in FIG. 4 are merely for explaining the embodiments of the present invention instead of limiting the present invention.

As shown in FIG. 4, it is assumed that there are five mutation patterns M1-M5, and the result of testing the second device 122 at the previous round shows that the mutation pattern M1 caused the abnormal states S1 and S2 at the second device 122, the mutation pattern M2 caused the abnormal state S3 at the second device 122, the mutation pattern M3 caused the abnormal state S2 and S3 at the second device 122, the mutation pattern M4 caused the abnormal state S1 at the second device 122, and the mutation pattern M5 caused the abnormal states S1 and S3 at the second device 122. The abnormal state S1 indicates that the response time of the second device 122 is too long, the abnormal state S2 indicates that the second device 122 must be rebooted, and the abnormal state S3 indicates that the connection of the second device 122 must be reset.

Further, in the case where the weights of the mutation patterns are not adjusted, the weights of the mutation patterns M1-M5 are all "1", so the probability of choosing any of them are also the same. In order to increase the probability that the second device 122 will be in an abnormal state, in some embodiments, the processor 122 may adopt the mutation strategy A in which the weights of the mutation patterns M1-M5 are determined according to the sum of the weights of the abnormal states S1-S3. In this case, the weights of the mutation patterns M1-M5 will be adjusted to "2", "1", "2", "1", and "2" respectively, thereby increasing the probability that the second device 122 simultaneously presents multiple abnormal states. In some embodiments, the processor 122 may adopt the mutation strategy B in which the weights of the abnormal states S1-S3 are modified according to their severity and then the weights of the mutation patterns M1-M5 are determined according to the sum of the adjusted weights of the abnormal states S1-S3. Under such circumstances, the weights of the mutation patterns M1-M5 will be adjusted to "9", "3", "10", "2", and "5" respectively, thereby increasing not only the probability that the second device 122 simultaneously presents multiple abnormal states but also the probability that the second device 122 falls into a serious abnormal state. In other embodiments, the processor 122 may also adopt other mutation strategies to adjust the weights of the mutation patterns M1-M5, and is not limited to adopt the mutation strategy A and the mutation strategy B shown in FIG. 4.

In some embodiments, the second device 122 may return its test results and/or its test data to the test data production system 11 after it has completed the test. Those will be a reference for the test data production system 11 to produce test data next time.

Figure 5:
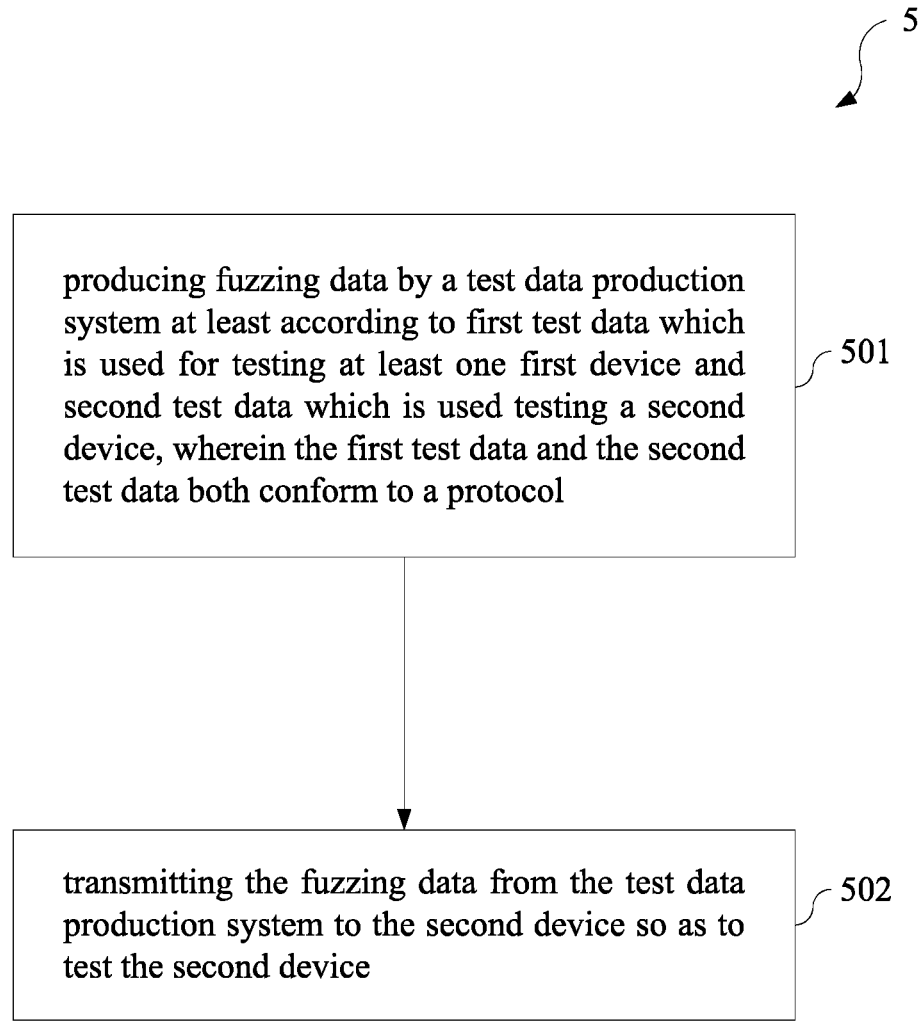
FIG. 5 illustrates a method for producing test data according to one or more embodiments of the present invention.

FIG. 5 illustrates a method for producing test data according to one or more embodiments of the present invention. The contents shown in FIG. 5 are merely for explaining the embodiments of the present invention instead of limiting the present invention.

Referring to FIG. 5, a method 5 for producing test data may comprise the following steps:

producing fuzzing data by a test data production system at least according to first test data which is used for testing at least one first device and second test data which is used for testing a second device, wherein the first test data and the second test data both conform to a protocol (marked as step 501); and transmitting the fuzzing data from the test data production system to the second device so as to test the second device (marked as step 502).

In some embodiments, the method 5 for producing the test data may further comprise the following steps:

the test data production system receiving the first test data from the at least one first device; and the test data production system receiving the second test data from the second device.

In some embodiments, the method 5 for producing the test data may further comprise the following step: merging the first test data and the second test data by the test data production system so as to produce the fuzzing data.

In some embodiments, the method 5 for producing the test data may further comprise the following steps:

producing third test data conforming to the protocol by the test data production system based on the first test data and the second test data via a machine-learning model; and merging the first test data, the second test data and the third test data by the test data production system so as to produce the fuzzing data.

In some embodiments, the method 5 for producing the test data may further comprise the following steps:

mutating the first test data and the second test data by the test data production system; and merging the mutated first test data and the mutated second test data by the test data production system so as to produce the fuzzing data. In these embodiments, optionally, the method 5 for producing the test data may further comprise the following step: determining weights of mutation patterns of the first test data and the second test data by the test data production system according to a result of testing the second device at a previous round.

In some embodiments, the method 5 for producing the test data may further comprise the following steps:

dividing the first test data into a plurality of first blocks by the test data production system;

dividing the second test data into a plurality of second blocks which correspond to the first blocks respectively, and calculating a rate of difference of each second block, by the test data production system;

adjusting content of one or more first blocks by the test data production system according to that of the corresponding second block(s) to produce adjusted first test data, as the rate of difference of the corresponding second block(s) is lower than a preset threshold; and merging at least the adjusted first test data and the second test data by the test data production system so as to produce the fuzzing data.

In some embodiments, the method 5 for producing the test data may further comprise the following steps:

dividing the first test data into a plurality of first blocks by the test data production system;

dividing the second test data into a plurality of second blocks which correspond to the first blocks respectively, and calculating a rate of difference of each second block, by the test data production system;

adjusting content of one or more first blocks by the test data production system according to that of the corresponding second block(s) to produce adjusted first test data, as the rate of difference of the corresponding second block(s) is lower than a preset threshold;

producing third test data conforming to the protocol by the test data production system based on the adjusted first test data and the second test data via a machine-learning model; and merging the adjusted first test data, the second test data and the third test data by the test data production system so as to produce the fuzzing data.

In some embodiments, the method 5 for producing test data may further comprise the following steps:

dividing the first test data into a plurality of first blocks by the test data production system;

dividing the second test data into a plurality of second blocks which correspond to the first blocks respectively, and calculating a rate of difference of each second block, by the test data production system;

adjusting content of one or more first blocks by the test data production system according to that of the corresponding second block(s) to produce adjusted first test data, as the rate of difference of the corresponding second block(s) is lower than a preset threshold;

mutating the adjusted first test data and the second test data by the test data production system; and merging the mutated first test data and the mutated second test data by the test data production system so as to produce the fuzzing data. In these embodiments, optionally, the method 5 for producing the test data may further comprise the following step: determining weights of mutation patterns of the adjusted first test data and the second test data by the test data production system according to a result of testing the second device at a previous round.

In addition to the aforesaid embodiments, there are other embodiments of the method 5 of producing the test data which correspond to those of the test data production system 11. These embodiment of the method 5 of producing the test data which are not mentioned specifically can be directly understood by people having ordinary skill in the art based on the aforesaid descriptions for the test data production system 11, and will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for producing test data, comprising:
a storage, configured to store first test data for testing
capability of at least one first device against cyberattacks and second test data for testing capability of a second device against cyberattacks, wherein the first test data and the second test data both conform to a protocol, the first test data and the second test data both comprise a plurality of test sub-data;
a processor electrically connected with the storage, configured to:
divide the first test data into a plurality of first blocks, wherein each of the first blocks comprises a portion of each test sub-data;
divide the second test data into a plurality of second blocks which correspond to the first blocks respectively, and calculates a rate of difference of each second block, wherein the rate of difference of each second block is calculated by analyzing a change of values of the test sub-data of each block in the second test data;
adjust content of one or more first blocks according to that of corresponding second block(s) respectively to produce adjusted first test data, as the rate of difference of the corresponding second block(s) is lower than a preset threshold; and
merge at least the adjusted first test data and the second test data so as to produce fuzzing data;
a transceiver electrically connected with the processor, configured to transmit the fuzzing data to the second device so as to test the second device with the fuzzing data in a testing mode against multifaceted cyberattacks.

2. The system for producing the test data of claim 1, wherein the first test data is transmitted from the at least one first device to the transceiver, and the second test data is transmitted from the second device to the transceiver.

3. The system for producing the test data of claim 1, wherein the processor is further configured to:
mutate the first test data and the second test data; and
merge the mutated first test data and the mutated second test data so as to produce the fuzzing data.

4. The system for producing the test data of claim 1, wherein the processor is further configured to determine weights of mutation patterns of the first test data and the second test data according to a result of testing the second device at a previous round.

5. The system for producing the test data of claim 1, wherein the third test data is produced based on the adjusted first test data and the second test data via the machine-learning model, and the processor merges the adjusted first test data, the second test data and the third test data so as to produce the fuzzing data.

6. The system for producing the test data of claim 1, wherein the processor is further configured to:
divide the first test data into a plurality of first blocks;
divide the second test data into a plurality of second blocks which correspond to the first blocks respectively, and calculates a rate of difference of each second block;
adjust content of one or more first blocks according to that of corresponding second block(s) to produce adjusted first test data, as the rate of difference of the corresponding second block(s) is lower than a preset threshold;
mutate the adjusted first test data and the second test data; and
merge the mutated first test data and the mutated second test data so as to produce the fuzzing data.

7. The system for producing the test data of claim 6, wherein the processor is further configured to determine weights of mutation patterns of the adjusted first test data and the second test data according to a result of testing the second device at a previous round.

8. A method for producing test data, comprising:
dividing first test data into a plurality of first blocks by a test data production system, wherein the first test data and second test data comprise a plurality of test sub-data, and each of the first blocks comprises a portion of each test sub-data;
dividing the second test data into a plurality of second blocks which correspond to the first blocks respectively, and calculating a rate of difference of each second block, by the test data production system, wherein the rate of difference of each second block is calculated by analyzing a difference rate of the test sub-data of each block in the second test data;
adjusting content of one or more first blocks by the test data production system according to that of corresponding second block(s) to produce adjusted first test data, as the rate of difference of the corresponding second block(s) is lower than a preset threshold;
merging at least the adjusted first test data and the second test data by the test data production system so as to produce fuzzing data; and
transmitting the fuzzing data from the test data production system to the second device so as to test the second device with the fuzzing data in a testing mode against multifaceted cyberattacks.

9. The method for producing the test data of claim 8, further comprising:
the test data production system receiving the first test data from the at least one first device; and
the test data production system receiving the second test data from the second device.

10. The method for producing the test data of claim 8, further comprising:
mutating the first test data and the second test data by the test data production system; and
merging the mutated first test data and the mutated second test data by the test data production system so as to produce the fuzzing data.

11. The method for producing the test data of claim 8, further comprising:
determining weights of mutation patterns of the first test data and the second test data by the test data production system according to a result of testing the second device at a previous round.

12. The method for producing the test data of claim 8, wherein the third test data is produced based on the adjusted first test data and the second test data via the machine-learning model, and the method for producing the test data further comprises:
merging the adjusted first test data, the second test data and the third test data by the test data production system so as to produce the fuzzing data.

13. The method for producing the test data of claim 8, further comprising:
dividing the first test data into a plurality of first blocks by the test data production system;
dividing the second test data into a plurality of second blocks which correspond to the first blocks respectively, and calculating a rate of difference of each second block, by the test data production system;
adjusting content of one or more first blocks by the test data production system according to that of corresponding second block(s) to produce adjusted first test data, as the rate of difference of the corresponding second block(s) is lower than a preset threshold;

mutating the adjusted first test data and the second test data by the test data production system; and merging the mutated first test data and the mutated second test data by the test data production system so as to produce the fuzzing data.

14. The method for producing the test data of claim 13, further comprising:

determining weights of mutation patterns of the adjusted first test data and the second test data by the test data production system according to a result of testing the second device at a previous round.

* * * * *